United States Patent [19]

Fick

[11] 3,975,593

[45] Aug. 17, 1976

[54] TIME DIVISION MULTIPLEX SYSTEM AND METHOD FOR THE TRANSMISSION OF BINARY DATA

[75] Inventor: Herbert Fick, Wolfratshausen, Germany

[73] Assignee: Siemens Aktiengesellschaft, Berlin & Munich, Germany

[22] Filed: Dec. 2, 1974

[21] Appl. No.: 528,726

[30] Foreign Application Priority Data
Dec. 6, 1973 Germany............................ 2360943

[52] U.S. Cl. ........................ 179/15 BV; 179/15 BA
[51] Int. Cl.[2] ........................ H04J 3/04; H04J 3/16
[58] Field of Search....... 179/15 BV, 15 BA, 15 AF, 179/15 A, 15 BS, 15 AL; 178/50

[56] References Cited
UNITED STATES PATENTS

| | | | |
|---|---|---|---|
| 3,665,405 | 5/1972 | Sanders et al................. | 179/15 BV |
| 3,749,841 | 7/1973 | Cohen et al................... | 179/15 BA |
| 3,752,933 | 8/1973 | Cohen et al................... | 179/15 BA |
| 3,862,373 | 1/1975 | Cohen et al................... | 179/15 BV |

*Primary Examiner*—Thomas A. Robinson

[57] ABSTRACT

A method and system for transmitting data in time division multiplex form is described. The data are composed of start-stop signals with a fixed transmission speed and a fixed signal frame, and of start-stop signals with arbitrary transmission speed and arbitrary signal frames. Signal frame control is used to transmit the signals having fixed transmission speeds and signal frames. The signals having arbitrary transmission speeds and signal frames are transmitted in a speed-transparent manner. Both groups of signals commonly employ in common the system's multiplex frame.

5 Claims, 1 Drawing Figure

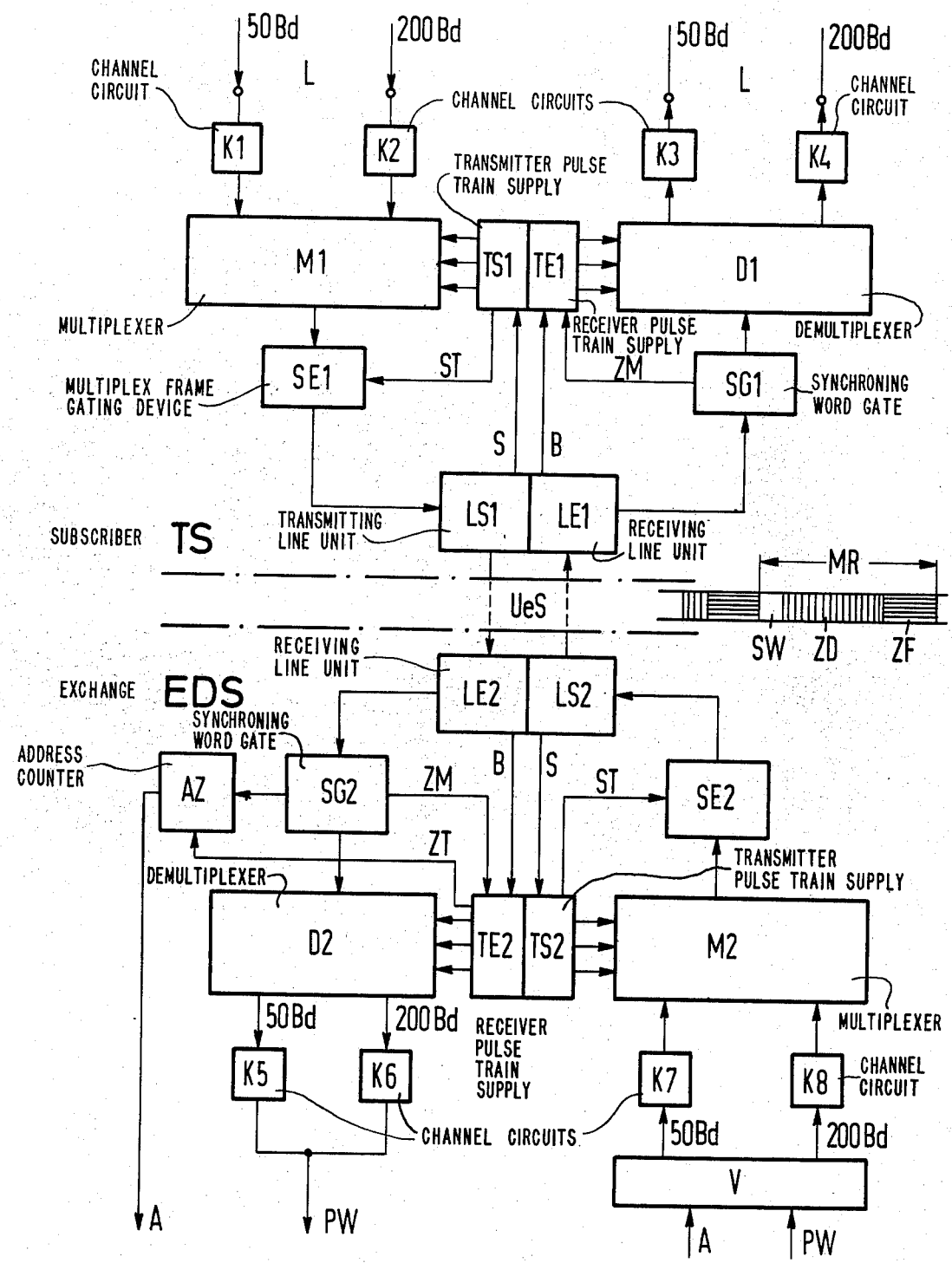

TIME DIVISION MULTIPLEX SYSTEM AND METHOD FOR THE TRANSMISSION OF BINARY DATA

BACKGROUND OF THE INVENTION

This invention relates to a time division multiplex system and method for the transmission of a plurality of items of data composed of start-stop signals with a steady transmission speed and a fixed signal frame, and of a plurality of items of data composed of start-stop signals of arbitrary transmission speed and arbitrary signal frames.

In future data networks the majority of subscribers will employ start-stop end devices of low transmission speeds. These include, for example, teleprinter devices with a transmission speed of 50 Bd. and a signal frame with 7.5 elements or bits, and data terminal devices with a transmission speed of between 50 and 200 Bd and signal frames in the region of 7.5 to 12 elements. Technical development has resulted in time division multiplex systems currently being more favored in some cases than the frequency multiplex systems which were previously mainly employed. Therefore, for the connection of the subscriber terminal devices to the exchanges one seeks multiplex systems which in the speech channel can offer a sufficient number of channels for the teleprinter terminal devices and channels for the data terminal devices.

In order to group channels for start-stop signals with a steady transmission speed and a fixed signal frame, time division multiplex systems with a signal-frame-controlled mode of operation are known, which for each element produced by the terminal device require one bit in the transmission channel. These systems make good use of the capacity of the multiplex transmission link. In such systems only data with known, constantly equal signal frames are transmitted in one and the same channel. This means that the actual information is embedded in a time frame composed of a start element and a stop element of at least 1.5 times the size of the signal frame. Signal-frame-controlled systems of this type are not suitable for channels which must permit arbitrary transmission speeds and signal frames within certain limits. However, speed-transparent multiplex systems are known (U.S. Pat. No. 3,535,450, German AS 2 005 836) with the aid of which channels of this type can also be grouped. As used herein, the term "speed-transparent" refers to a communications transmission channel capable of permitting the transmission of arythmnical messages at all data signalling rates less than a maximum rate for the channel. These systems operate with multiple scanning of each date element and coding of the time state of the polarity change. For each element of the end device they require a plurality of bits in the transmission channel; the number of these bits is dependent upon the permissible engagement error. The requirement for transmission capacity in these systems is thus considerably higher than in the signal-frame-controlled systems. If such a system is used to group the data channels and the teleprinter channels, the total number of channels which may be accommodated in the speech channel is insufficient.

It is, therefore, an object of the invention to provide a time division multiplex system which permits an optimum exploitation of the capacity of the multiplex transmission line.

SUMMARY OF THE INVENTION

The aforementioned and other objects are realized in accordance with the invention in that the characters are transmitted with a steady transmission speed and a fixed signal frame in known manner in signal-frame-controlled fashion, and the signals having arbitrary transmission speeds and arbitrary signal frames are transmitted in known manner in speed-transparent fashion. The multiplex frame of the system is employed in common by both signal groups.

Thus, in accordance with the invention, a standard method of transmitting signals having a fixed transmission speed and signals having an arbitrary transmission speed is dispensed with. This leads to a more economical exploitation of the existing frequency band.

BRIEF DESCRIPTION OF THE DRAWING

The principles of the invention will be explained making reference to a description given below of a preferred embodiment, which is illustrated in the single FIGURE drawing. The FIGURE contains a block-schematic diagram of a time division multiplex data transmission system constructed according to the principles of the invention.

DETAILED DESCRIPTION OF THE DRAWING

The system illustrated in the FIGURE is a time division multiplex transmission system with signal-frame-controlled operation, a bit-wise interlocking arrangement for teleprinter terminals and transparent operation for data terminals. A time division multiplex transmission arrangement of this kind offers a permanent transmission capacity to each subscriber, i.e., each subscriber obtains a time slot, which he is permanently assigned, in the bit flow of the multiplex link. The number of connections which can take place simultaneously is, thus, always equal to the number of subscribers connected to the multiplexer.

At subscriber end TS, the lines L end and start in the channel circuits K1, K2, K3, and K4. Those lines over which the signals having a fixed transmission speed and a fixed signal frame, thus, for example, teleprinter signals are transmitted are referred to as 50 Bd. Those lines over which the signals having a transmission speed which may be arbitrarily selected within certain limits and with an arbitrary signal frame are transmitted are referred to as 200 Bd.

In the channel circuits of the type K1 start-stop signals coming from the teleprinter subscribers are classified into a standard time pattern and, commencing from the start element, are brought to the theoretical element length. Differences in speed between the connection line and the multiplex channel are compensated by a reduction or lengthening of the stop element. The signals which have been prepared in this way are scanned or sampled at the interval of the theoretical element length by the multiplexer M1 and are interlocked in a frame which possesses one time slot for each connection line. Thus, the information from the individual channels is accommodated in the multiplex signal interlocked in bits.

In the channel circuits of the type K2 the start-stop signals coming from the data subscribers are scanned with a pulse train. If a polarity change occurs, in the channel circuit a pulse group is formed whose start bit in each case is of the new polarity. The other pulses of the pulse group fix the time state of the polarity change in relation to the scanning pulse train of the multiplexer in coded form. At regular intervals, the multiplexer M1 scans the channel circuits of the type K2 and gates the pulses of the aforementioned pulse groups into the multiplex bit flow. The multiplex signal appearing at the output of the multiplexer M1 is also supplemented by a synchronizing word which, for purposes of frame synchronization, is gated at regular intervals into the multiplex bit flow.

This gating-in is carried out in a special device SE1 which receives a control pulse train ST from a transmitting-end pulse train supply TS1. Then, at the output of SE1, appears the complete multiplex frame MR which is shown in the right-hand part of the drawing. Thus, in this example the multiplex frame MR is initiated by the synchronizing word SW. This synchronizing word is followed by the time slots for the data signals ZD, and these are in turn followed by the time slots for the teleprinter signals ZF.

The multiplex signal is conducted to the transmitting end line unit LS1 which converts the signal into a form suitable for transmission over the transmission link UeS. For correction of the pulse train of the transmitting-end pulse train supply TS1, this transmitting-end line unit LS1 supplies a control pulse train S.

The signal which is transmitted in the opposite direction from the exchange EDS is received by the receiving-end line unit LE1 where it is converted into the multiplex signal and forwarded to a device serving to detect the synchronizing word SG1. The line unit LE1 also supplies a pulse train to the receiving-end pulse train supply TE1 and thus ensures that the pulse train which controls the demultiplexer D1 is corrected. The device serving to detect the synchronizing word SG1 gates the synchronizing word out of the multiplex signal and also forwards a synchronizing time marking to the receiving end pulse train supply TE1, so that the demultiplexer D1 can distribute the data between the receiving end channel circuits K3, K4 in the correct assignment. In the channel circuits of the type K3 the items of channel information supplied by the demultiplexer are converted into teleprinter signals. In the channel circuits of the type K4 on the other hand the time state decoding and element formation for the signals with arbitrary transmission speed and arbitrary signal frame are effected as described in the aforementioned U.S. Pat. No. 3 535 450. All these circuits used at the subscriber end are of known construction.

The signal transmitted from the subscriber end TS to the exchange EDS is received by the line unit LE2 which restores the original multiplex signal and passes it to the device serving to detect the synchronizing word SG2. The line unit LE2 also supplies the bit pulse train B to correct the pulse train of the receiving-end pulse train supply TE2 which controls the demultiplexer D2 and supplies the counter pulse train ZT for a counter for purposes of address formation AZ. The device SG2, like the corresponding device at the subscriber end, emits a synchronizing time marking to the pulse train supply TE2 and thus ensures that the demultiplexer D2 can distribute the scanning samples transmitted in the individual time slots of the multiplex signal in the correct assignment between the receiving-end channel circuits K5, K6. The counter AZ is started by the synchronizing word detector SG2 as soon as the counter AZ has recognized the synchronizing word which initiates the multiplex frame MR. The counter is then stepped in accordance with the timing of the counter pulse train ZT. At the time of each time slot, it will produce at its outputs a specific binary combination which is used as address of a specific storage position in the exchange, which position is permanently assigned to the time slot and thus to a specific subscriber.

In the foregoing description it has been assumed that the exchange system is a known electronic data exchange system with pseudo-switch-through. In such an exchange system, whenever a polarity change occurs on a specific line, an address is formed with the aid of which a specific storage position permanently assigned to the line may be reached in a central store. The contents of this storage position, including the address of the trunk line, is read out, and the address of the trunk line and the new polarity are passed to the output circuits of the exchanges. The binary combination which appears at the output of the counter AZ is, thus, to be considered as the address A of a specific time slot.

The demultiplexer D2 now distributes the information contained in the time slots ZD and ZF between the individual channel circuits K5 and K6. In the channel circuits of the type K5 which serve to accommodate signals with a fixed transmission speed and a fixed signal frame, a restoration of polarity now takes place. In each channel circuit of the type K5 the last bit to arrive is compared with the bit which arrived one element before. In the case of unequal polarity, the polarity change PW is made available for the switch-through in the exchange.

In the channel circuits of the type K6 which serve to accommodate signals with arbitrary transmission speed and arbitrary signal frame, triggered by the new polarity which acts as start bit, the time state of the polarity change is reestablished through the decoding of the time-determining pulses of the above mentioned pulse groups. The polarity change PW is passed on together with the associated address which has been made available by the counter AZ for switch-through in the exchange.

In the reverse direction, addresses A and polarity changes PW are conducted from the exchange, firstly to a distributor circuit V or to a so-called output code converter. This distributor circuit V distributes the polarity changes using the addresses which are additionally supplied between the channel circuits K5, K8 in which the same processes take place as in the above described channel circuits K1 and K2.

The functions and the constructions of the other circuit components at the exchange end, namely of the multiplexer M2, the pulse train supply TS2, the device for gaing in the synchronizing word SE2 and the line unit LS2 also do not differ from those of the corresponding units at the subscriber end TS. In addition the distributor V along with the other elements described herein are of known construction.

The preferred embodiment described hereinabove is intended only to be exemplary of the principles of the invention. It is contemplated that the described embodiment can be modified or changed in a variety of ways while remaining within the scope of the invention, as defined by the appended claims.

I claim:

1. A method of time division multiplex transmission of data comprising start-stop signals with a fixed transmission speed and signal frame and also comprising start-stop signals with arbitrary transmission speeds and signal frames, comprising the steps of:

transmitting signals having fixed transmission speeds and signal frames using signal frame control, and transmitting signals having arbitrary transmission speeds and signal frames in a speed-transparent manner, said transmitting steps employing a common multiplex frame.

2. The method defined in claim 1 comprising the additional step of:

multiple scanning of signal elements and coding of the time position of the polarity changes whereby signals having arbitrary transmission speeds and arbitrary signal frames are transmitted.

3. In a time division multiplex transmission system of data comprising start-stop signals with fixed transmission speeds and signal frames and also comprising start-stop signals with arbitrary transmission speeds and signal frames, the improvement comprising:

means for transmitting signals with fixed transmission speeds and signal frames under signal frame control and means for transmitting signals with arbitrary transmission speeds and signal frames in a speed-transparent manner, said transmitting means, respectively, being constructed to employ in common multiplex frame of the system.

4. The improved time division multiplex transmission system defined in claim 3 wherein data are transmitted between connection lines and an electronic data exchange using an asynchronous time division multiplex form of transmission, further comprising:

means for generating a synchronizing word, means for producing, responsive to said synchronizing word, a multiplex frame, means for detecting said synchronizing word, counter means, initiated with each time slot in said multiplex frame, for producing a binary address and locating means for utilizing said address to reach a storage position assigned to a said time slot in said exchange.

5. The improved time division multiplex transmission system defined in claim 4, further comprising:

first channel circuit means for restoration of polarity changes in signal frame controlled transmissions, second channel circuit means for time state decoding of speed-transparent transmissions, demultiplexer means for receiving transmitted scanning samples and coupling signal frame controlled signals to said first channel circuit means and for coupling speed-transparent signals to said second channel circuit means, means in said first channel circuit means for comparing the last bit to arrive with the bit arriving one element therebefore and, in the event of unequal polarity, making available the polarity change for switch-through, means in said second channel means for analyzing a pulse group produced by multiple scanning, for reestablishing the time state of the polarity change and for emitting for switch-through the time state along with associated addresses.

* * * * *